United States Patent [19]
Rossiter

[11] Patent Number: 6,131,987
[45] Date of Patent: Oct. 17, 2000

[54] GLARE SHIELDING ASSEMBLY FOR USE WITH AN AUTOMOBILE

[76] Inventor: Frank Rossiter, 208 National Union Blvd., Tuckerton, N.J. 08087

[21] Appl. No.: 09/435,567

[22] Filed: Nov. 8, 1999

Related U.S. Application Data

[63] Continuation-in-part of application No. 09/063,221, Apr. 20, 1998, Pat. No. 5,885,873.

[51] Int. Cl.[7] ........................................................ B60J 3/02
[52] U.S. Cl. ......................................... 296/97.8; 296/97.2
[58] Field of Search .................................. 296/97.8, 97.4, 296/97.11, 97.5, 97.2

[56] References Cited

U.S. PATENT DOCUMENTS 5,443,300  8/1995  Mohammed ........................ 296/97.8 X
5,842,748  12/1998  Cummins ........................... 296/97.8 X

*Primary Examiner*—Joseph D. Pape
*Attorney, Agent, or Firm*—Goldstein & Canino

[57] ABSTRACT

A glare shielding assembly to be secured to the interior of an automobile above the windshield for reducing glare from bright sunlight and oncoming headlights. The glare shielding assembly includes a compartment, and first and second glare-reducing panels wound around each of the tubes. Two belt driven deployment mechanisms are in operative engagement with each panel such that the glare-reducing panel rolls down from the compartment when said deployment mechanisms are activated. The first glare-reducing panel is treated with appropriate tint coatings which most effectively reduce glare from bright sunlight. The second glare-reducing panel is treated with appropriate antireflective coatings which afford the clearest nighttime driving vision.

3 Claims, 2 Drawing Sheets ial 6,131,987

GLARE SHIELDING ASSEMBLY FOR USE WITH AN AUTOMOBILE

CROSS REFERENCES AND RELATED SUBJECT MATTER

This application is a continuation-in-part of U.S. patent application Ser. No. 09/063,221, filed in the United States Patent Office on Apr. 20, 1998 now U.S. Pat. No. 5,885,873.

BACKGROUND OF THE INVENTION

This invention relates to a glare shielding assembly for use with an automobile or other motorized vehicle. More particularly, the invention relates to an assembly which is secured above the windshield inside an automobile, for shielding the driver's eyes from bright sunlight during daytime driving as well as reducing blinding glare of oncoming headlights during nighttime driving.

As the sun rises or sets, it is positioned low in the sky—just above the horizon. At these times, driving an automobile toward the bright sunlight can be a difficult and unpleasant endeavor. In addition to the arduous demand of driving, the driver's constant struggle with glare and lack of road visibility may interfere with the driver's performance behind the wheel making the ride relatively unsafe for the driver and passengers. A struggle with glare is not only encountered during daytime but the visual difficulty is also experienced by many drivers during nighttime driving.

At night due to the relative darkness, the eyes becoming more sensitive to light, especially to oncoming headlights which can have a blinding glare effect. Thus, it is desirable to have a device that can shield the eyes of the driver from bright sunlight as well as the blinding glare of oncoming headlights so that the driver can concentrate on driving, without any visual interference.

Various references uncovered in the prior art provide devices which are secured above the windshield and utilized for the purpose of blocking sunrays to ensure the comfort and safety of the drivers and passengers. For example, U.S. Pat. No. 5,000,506 to Abu-Shumays discloses sun shades for automobiles which are capable of independently and simultaneously covering top adjacent parts of a windshield and a side window. Likewise, U.S. Pat. No. 5,042,866 to Cody discloses an automobile sun screen comprising a flexible shade member mounted in a furled orientation about an upper axle within a compartment, with a drive motor to effect furling mounted to the upper axle and a further drive motor mounted to a lower axle to effect unfurling of the screen. U.S. Pat. No. 4,558,899 to Chu discloses a collapsible visor including a plurality of interconnected panels which fold on one another in an accordion-like fashion for collapsing the visor into a compartment mounted within a vehicle headliner.

Despite all these sunray-blocking devices, there is still a further need to provide an improved glare shielding assembly. Such a glare shielding assembly should protect the driver's eyes from blinding glare so that the driver can concentrate on driving without struggling with the glare. Moreover, such a glare shielding assembly should incorporate a first glare-reducing panel treated with suitable tint coatings which most effectively lessens the glaring rays of the sun without sacrificing visibility, and a second glare-reducing panel treated with suitable antireflective coatings which afford the clearest nighttime driving vision by effectively reducing glare from oncoming headlights.

While these units mentioned above may be suitable for the particular purpose employed, or for general use, they would not be as suitable for the purposes of the present invention as disclosed hereafter.

SUMMARY OF THE INVENTION

It is an object of the invention to provide a glare shielding assembly which is secured above the windshield of an automobile for protecting the driver's eyes from blinding glare so that the driver can concentrate on driving without struggling with glare.

It is another object of the invention to provide a glare shielding assembly which employs first and second glare-reducing panels extendably and retractably mounted within a compartment for permitting a driver to selectively roll down the panel that will provide the sharpest vision, free of glare for safer driving.

It is yet another object of the invention to provide a glare shielding assembly which includes a first glare-reducing panel treated with tint coatings or otherwise made of a material which most effectively lessens the glaring rays of the sun without sacrificing visibility, and a second glare-reducing panel treated with suitable antireflective coatings or other materials which afford the clearest nighttime driving vision by effectively reducing glare from oncoming headlights.

It is a further object of the invention to provide a glare shielding assembly which deploys the appropriate panel under the power of a belt driven deployment system.

The invention is a glare shielding assembly to be secured to the interior of an automobile above the windshield for reducing glare from bright sunlight and oncoming headlights. The glare shielding assembly includes a compartment, and first and second glare-reducing panels wound around each of the tubes. Two belt driven deployment mechanisms are in operative engagement with each panel such that the glare-reducing panel rolls down from the compartment when said deployment mechanisms are activated. The first glare-reducing panel is treated with appropriate tint coatings which most effectively reduce glare from bright sunlight. The second glare-reducing panel is treated with appropriate antireflective coatings which afford the clearest nighttime driving vision.

To the accomplishment of the above, and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
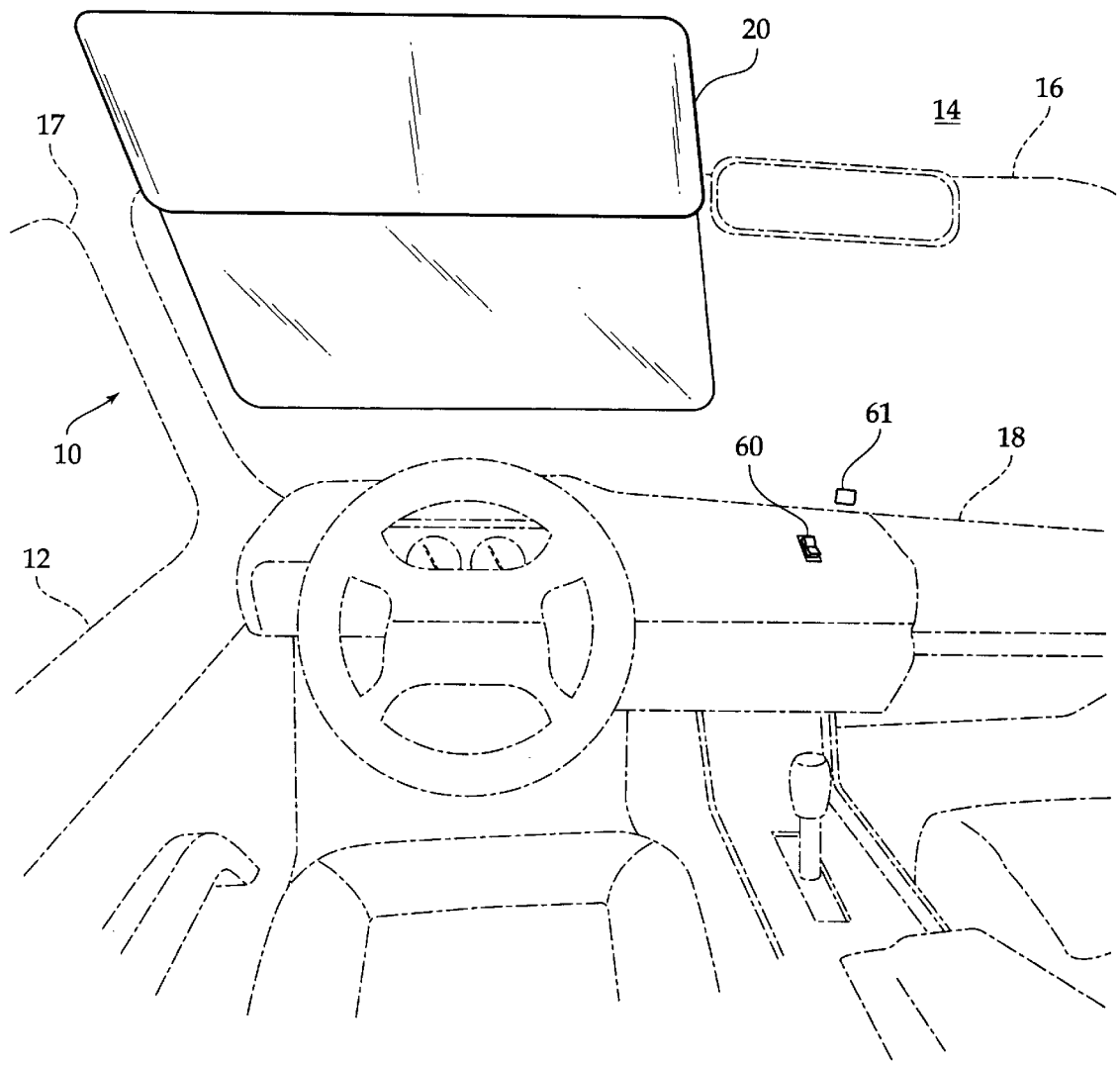
FIG. 1 is a diagrammatic perspective view of the instant invention secured inside an automobile above the windshield, illustrating one of the glare-reducing panel in its deployed, downward position.

FIG. 1 illustrates an automotive vehicle incorporating the principles of a preferred embodiment of the present invention 10. For a better understanding of the present invention 10, the automotive vehicle 12 is illustrated comprising generally of an interior, roof 14, windshield 16, front side window 17, and dashboard 18. The glare shielding assembly 10 includes a compartment 20 which can be secured inside the automobile 12 above the windshield 16 and adjacent to the roof 14 by a affixing screws, by applying adhesives, or by any other fastening means as would be appreciated by those skilled in the art. In addition, the glare shielding assembly 10 can be mounted by means of a special bracket which allows the position of the compartment 20 to be adjusted relative to the windshield.

Figure 2:
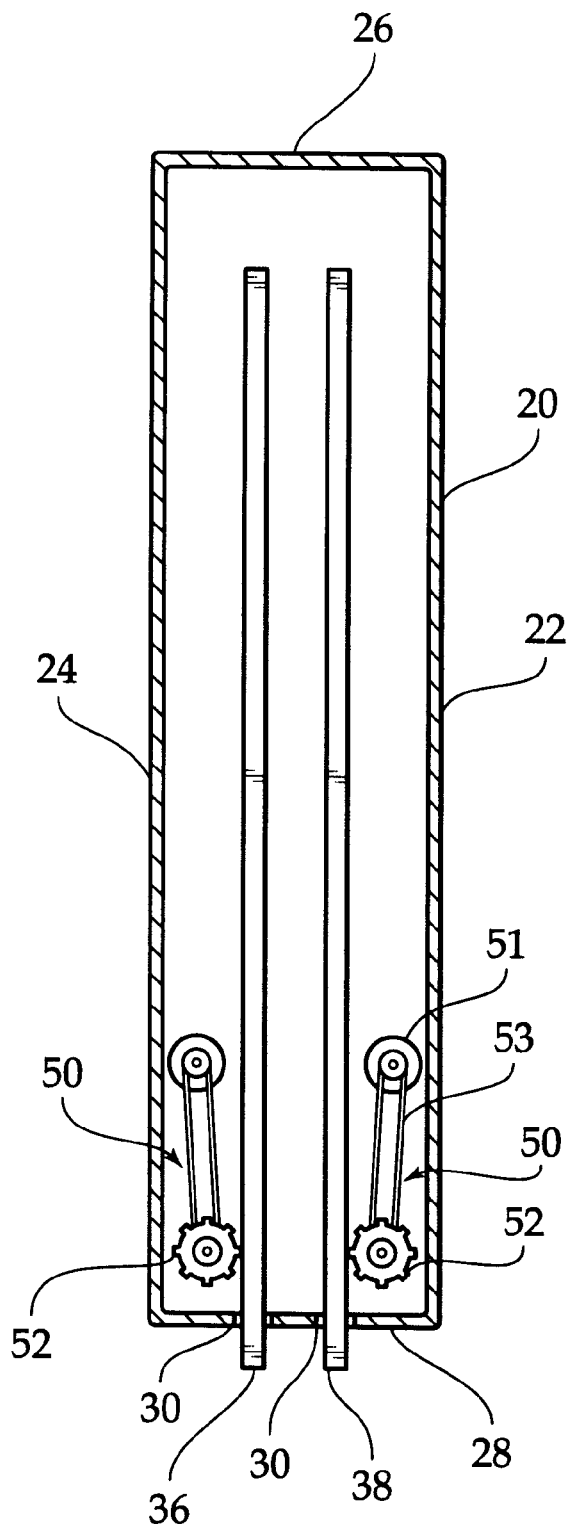
FIG. 2 is a cross-sectional side elevational view of the instant invention, illustration the interior of the compartment which houses the panels.

FIG. 2 illustrates the compartment 20 defined by a front wall 22, a back wall 24, a top wall 26, a bottom wall 28, and side walls. The bottom wall 28 of the compartment 20 has two narrow apertures 30 extending longitudinally between the side walls. The glare shielding assembly 10 comprises first 36 and second 38 glare-reducing panels. The first and second glare-reducing panels are rigid in nature. The compartment further includes two belt driven deployment mechanisms 50. Each belt driven deployment mechanism 50 includes a motor 51, a contact wheel 52, and a belt 53. Each contact wheel 52 directly engages one of the panels in close frictional contact, so that movement of the contact wheel tends to extend that panel out of the compartment, or retract that panel into the housing. The contact wheel 52 is preferably made of a rubberized material, so that said contact wheel does not mar or scratch the panel. Each motor 51 is electrically connected so that when not actuated, an infinite load is not present across said motor, so that the motor does not resist panel extension and retraction of the panels. The belt 53 provides mechanical connection between the motor 51 and contact wheel 52.

The first 36 and second 38 glare-reducing panels are constructed of rigid, transparent material that is capable of reducing glare without obscuring visibility. Each panel includes an upper portion and a lower portion. The first glare-reducing panel 36 is designed to provide glare protection during daytime driving. Accordingly, the first glare-reducing panel 36 is preferably treated with appropriate tint coatings for reducing glare from bright light source such as the sunlight. The second glare-reducing panel 38 is preferably treated with antireflective coatings that are most effective in reducing glare from oncoming headlights, thereby affording the clearest night vision. Although in a preferred embodiment of the second glare-reducing panel 38, antireflective coatings are utilized, it should be noted that any other suitable optical treatment can be employed capable of enhancing night driving vision including application of UV protection so as to reduce blue rays and all other blinding night glare.

In operation, the driver can select between the first 36 and second 38 glare-reducing panels, to use the one that will provide him or her with the sharpest vision under the current driving conditions. The driver may manually pull down the first glare-reducing panel 36 whenever he or she is distracted by glare from bright sunlight. Likewise, to lessen the glaring rays of the oncoming headlights, the driver simply pulls down the second glare-reducing panel 38 from the compartment 20 to enjoy sharper vision for safer night driving. Alternatively, one of the motors 51 may be activated to lower its associated glare-reducing panel. The motor 51 may be activated by a switch 60 on the dashboard, or may be automatically activated by a light sensor 61, located on the windshield, or on the dashboard adjacent to the windshield. When automatically lowered the glare-reducing panel 36 will remain lowered until distracting glaring lights are no longer present.

While the embodiments of the present invention 10 are disclosed in relation to blocking glare coming through the windshield 16, it will be appreciated by those skilled in the art that the glare shielding assembly disclosed herein may be used for shading a driver's eyes from blinding light coming from the side 17 by securing the glare shielding assembly 10 to the interior of the vehicle just above the front side window 17. Many specific details contained in the above description merely illustrate some preferred embodiments and should not be construed as a limitation on the scope of the invention. Many other variations are possible.

What is claimed is:

1. A glare shielding assembly for use with an automobile having a windshield and an interior, said glare shielding assembly comprising:

a) a compartment secured to the interior of the automobile above the windshield;

b) a first glare-reducing panel having opposite upper and lower portions, said first glare-reducing panel located within said compartment, said first glare-reducing panel constructed of a rigid, transparent material capable of reducing glare without obscuring visibility;

c) a second glare-reducing panel having opposite upper and lower portions, said second glare-reducing panel located within said compartment, said second glare-reducing panel constructed of a rigid, transparent material capable of reducing glare without obscuring visibility; and d) extending and retracting means for selectively permitting said first glare-reducing panel and said second glare-reducing panel to extend downwardly from and retract upwardly into said compartment.

2. The glare shielding assembly as recited in claim 1, wherein the first glare-reducing panel is tinted to reduce glare from bright sunlight, and wherein the second glare-reducing panel is treated with antireflective coatings for reducing glare from oncoming headlights.

3. The glare shielding assembly as recited in claim 2, wherein the extending and retracting means further comprises:

a) a motor;

b) a contact wheel for directly contacting one of the panel; and c) a belt, mechanically linking the motor and contact wheel.

* * * * *